(12) United States Patent
Burke et al.

(10) Patent No.: US 7,969,380 B2
(45) Date of Patent: Jun. 28, 2011

(54) ANTENNA GASKET FOR PROCESS HOUSINGS

(75) Inventors: Aaron Burke, Hamilton, MA (US); Michael Joens, Beverly, MA (US)

(73) Assignee: Millipore Corporation, Billerica, MA (US)

(*) Notice: Subject to any disclaimer, the term of this patent is extended or adjusted under 35 U.S.C. 154(b) by 0 days.

(21) Appl. No.: 13/020,914

(22) Filed: Feb. 4, 2011

(65) Prior Publication Data

US 2011/0121946 A1 May 26, 2011

Related U.S. Application Data

(63) Continuation of application No. 12/079,314, filed on Mar. 26, 2008, now Pat. No. 7,898,495.

(51) Int. Cl.
*H01Q 1/42* (2006.01)
(52) U.S. Cl. .......... 343/872; 343/873; 343/906; 210/85; 210/91; 96/417; 96/421; 96/423
(58) Field of Classification Search .............. 343/872, 343/873, 906
See application file for complete search history.

(56) References Cited

U.S. PATENT DOCUMENTS

| | | | |
|---|---|---|---|
| 5,674,381 A | 10/1997 | Dekker | |
| 7,048,775 B2 * | 5/2006 | Jornitz et al. | 95/1 |
| RE39,361 E | 10/2006 | Dekker | |
| 7,259,675 B2 | 8/2007 | Baker et al. | |
| 7,811,365 B2 * | 10/2010 | Grzonka et al. | 96/417 |
| 2002/0021208 A1 | 2/2002 | Nicholson et al. | |
| 2003/0127644 A1 | 7/2003 | Chen | |
| 2004/0032330 A1 | 2/2004 | Hoffman | |
| 2004/0182761 A1 | 9/2004 | Kuennen et al. | |
| 2004/0256328 A1 | 12/2004 | Jornitz et al. | |
| 2005/0205658 A1 | 9/2005 | Baker et al. | |
| 2006/0178695 A1 | 8/2006 | Decant, Jr. et al. | |
| 2007/0200703 A1 | 8/2007 | Baker et al. | |
| 2007/0210923 A1 | 9/2007 | Butler et al. | |
| 2007/0240492 A1 | 10/2007 | DiLeo et al. | |

(Continued)

FOREIGN PATENT DOCUMENTS

WO 2006/045477 A1 5/2006

(Continued)

OTHER PUBLICATIONS

Texas Instruments, Hf Antenna Design Notes Technical Application Report, 11-08-26-003, Sep. 2003, Radio Frequency Identification Systems.

(Continued)

*Primary Examiner* — Hoang V Nguyen
(74) *Attorney, Agent, or Firm* — Nields, Lemack & Frame, LLC

(57) ABSTRACT

A method and apparatus for providing wireless communication and optionally power to the interior of a housing assembly is disclosed. In one embodiment, an antenna is molded within a gasket material, such as silicon, so as to be completely encapsulated. The gasket preferably includes at least one support arm, which holds the antenna toward the middle of the housing, so as to minimize interference from the metal housing. In further embodiments, an inductive coil is encapsulated in the gasket. An alternating current is passed through this coil to create a changing magnetic field, which can then be used to create electrical power in physically separate components, such as filtering elements. In certain embodiments, multiple loops are molded to correspond to multiple filtering elements within the housing.

20 Claims, 5 Drawing Sheets

U.S. PATENT DOCUMENTS

| | | |
|---|---|---|
| 2007/0240578 A1 | 10/2007 | DiLeo |
| 2007/0243113 A1 | 10/2007 | DiLeo |
| 2007/0262867 A1 | 11/2007 | Westrick et al. |
| 2008/0065290 A1 | 3/2008 | Breed et al. |
| 2008/0069736 A1 | 3/2008 | Mingerink et al. |
| 2008/0087588 A1 | 4/2008 | Grzonka et al. |
| 2009/0225626 A1 | 9/2009 | Baumfalk et al. |

FOREIGN PATENT DOCUMENTS

| | | |
|---|---|---|
| WO | 2006/130528 A1 | 12/2006 |

OTHER PUBLICATIONS

International Search Report and Written Opinion of the International Searching Authority dated May 19, 2009 in corresponding international application PCT/US 09/01597.

International Search Report and Written Opinion of the International Searching Authority dated Jul. 2, 2009 in corresponding international application PCT/US 09/01627.

Office Action in co-pending U.S. Appl. No. 12/079,396 dated Apr. 11, 2011.

* cited by examiner

ANTENNA GASKET FOR PROCESS HOUSINGS

This application is a continuation of U.S. patent application Ser. No. 12/079,314, filed Mar. 26, 2008, the disclosure of which is incorporated herein by reference in its entirety.

BACKGROUND OF THE INVENTION

The use of RFID tags and other electronic devices, such as Bluetooth and Zigbee devices, has become prevalent, especially in the management of assets, particularly those applications associated with inventory management. For example, the use of RFID tags permits the monitoring of the production line and the movement of assets or components through the supply chain.

To further illustrate this concept, a manufacturing entity may adhere RFID tags to components as they enter the production facility. These components are then inserted into the production flow, forming sub-assemblies in combination with other components, and finally resulting in a finished product. The use of RFID tags allows the personnel within the manufacturing entity to track the movement of the specific component throughout the manufacturing process. It also allows the entity to be able to identify the specific components that comprise any particular assembly or finished product.

In addition, the use of RFID tags has also been advocated within the drug and pharmaceutical industries. In February 2004, the United States Federal and Drug Administration issued a report advocating the use of RFID tags to label and monitor drugs. This is an attempt to provide pedigree and to limit the infiltration of counterfeit prescription drugs into the market and to consumers.

Since their introduction, RFID tags have been used in many applications, such as to identify and provide information for process control in filter products. U.S. Pat. No. 5,674,381, issued to Den Dekker in 1997, discloses the use of "electronic labels" in conjunction with filtering apparatus and replaceable filter assemblies. Specifically, the patent discloses a filter having an electronic label that has a read/write memory and an associated filtering apparatus that has readout means responsive to the label. The electronic label is adapted to count and store the actual operating hours of the replaceable filter. The filtering apparatus is adapted to allow use or refusal of the filter, based on this real-time number. The patent also discloses that the electronic label can be used to store identification information about the replaceable filter.

A patent application by Baker et al, published in 2005 as U.S. Patent Application Publication No. US2005/0205658, discloses a process equipment tracking system. This system includes the use of RFID tags in conjunction with process equipment. The RFID tag is described as capable of storing "at least one trackable event". These trackable events are enumerated as cleaning dates, and batch process dates. The publication also discloses an RFID reader that is connectable to a PC or an internet, where a process equipment database exists. This database contains multiple trackable events and can supply information useful in determining "a service life of the process equipment based on the accumulated data". The application includes the use of this type of system with a variety of process equipment, such as valves, pumps, filters, and ultraviolet lamps.

In addition to RFID tags, the possibility exists to include other electronics in the filtering elements as well. Another patent application, filed by Jornitz et al and published in 2004 as U.S. Patent Application Publication No. 2004/0256328, discloses a device and method for monitoring the integrity of filtering installations.

This publication describes the use of filters containing an onboard memory chip and communications device, in conjunction with a filter housing. The filter housing acts as a monitoring and integrity tester. That application also discloses a set of steps to be used to insure the integrity of the filtering elements used in multi-round housings. These steps include querying the memory element to verify the type of filter that is being used, its limit data, and its production release data.

More and more, other electronics such as sensors, including pressure sensors, temperature sensors and concentration sensors, have also been added to filtering elements to further expand the capabilities of these devices. Co-pending U.S. Patent Application Publication Nos. 2007/0240578, 2007/0243113 and 2007/0240492 all describe additional electronics that can be added to filtering elements to improve system performance and availability.

However, despite the rapid increase in the ability and the desire to add advanced electronics to filtering elements, there remain significant drawbacks. For example, the issue of effectively communicating to an electronic device within a stainless steel (or other metal) housing remains problematic. In some cases, communication can only be effectuated by using an alternate housing material that allows wireless transmissions to pass through it (such as plastic), or by introducing a small window in the housing through which wireless signals can pass. In other cases, wires are fed into the housing to the various components.

A more reliable, minimally intrusive method of communicating with the devices within a housing assembly is needed.

SUMMARY OF THE INVENTION

The problems of the prior art are minimized by the present invention, which discloses a method and apparatus for providing wireless communication and optionally power to the interior of a housing assembly.

In one embodiment, an antenna is molded within a gasket material, such as silicon, so as to be completely encapsulated. This gasket is used as a seal between two separable portion of the housing assembly, such as the upper and lower housings. The gasket preferably includes at least one support arm, which holds the antenna toward the middle of the housing, so as to minimize interference from the metal housing. In certain embodiments, multiple support arms are used. In preferred embodiments, a dipole antenna is used to communicate with electronics contained within the housing, such as integrated in filtering elements.

In further embodiments, an inductive coil is encapsulated in the gasket. An alternating current is passed through this coil to create a changing magnetic field, which can then be used to create electrical power in physically separate components, such as filtering elements. This coil can be located near the inner circumference of the gasket, or can be positioned anywhere within the housing. In certain embodiments, multiple loops are molded to correspond to multiple filtering elements within the housing.

DETAILED DESCRIPTION OF THE FIGURES

Figure 1:
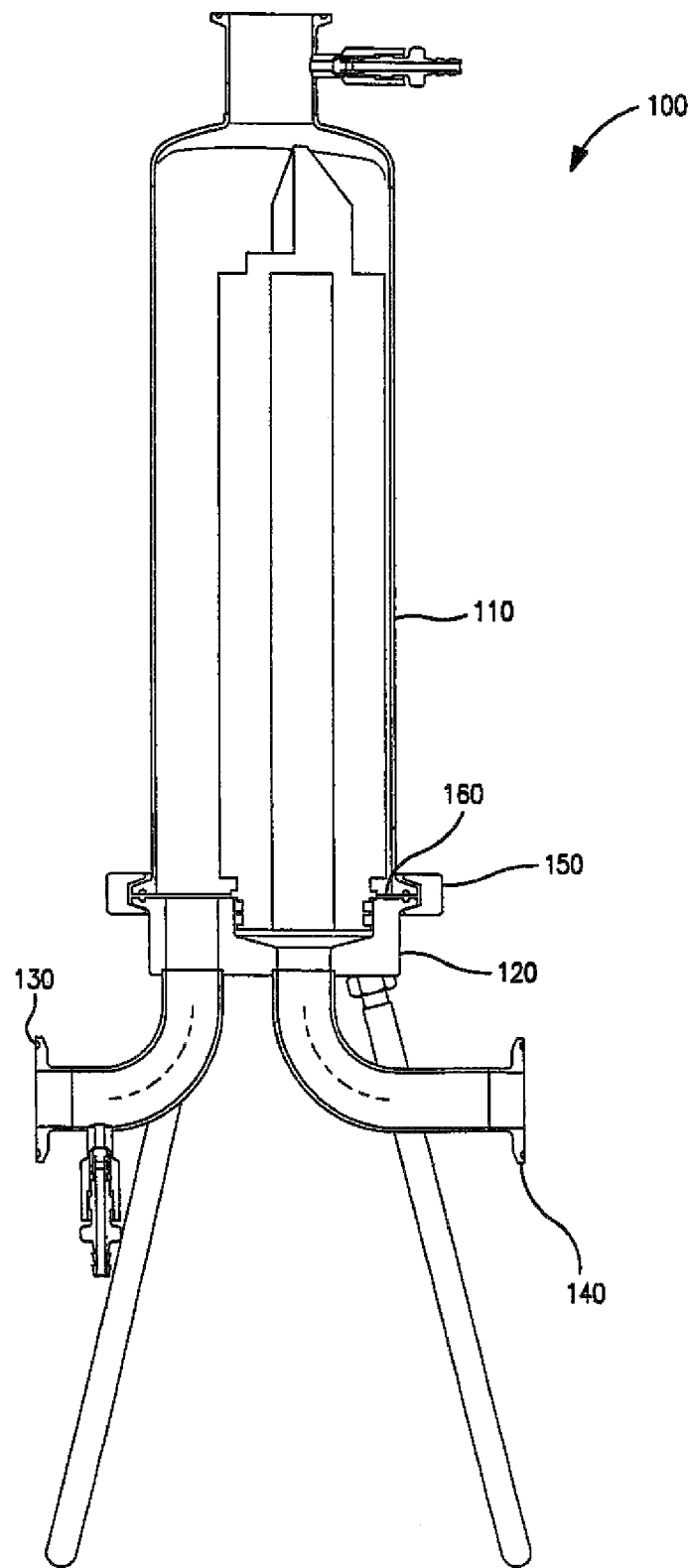
FIG. 1 shows a representative stainless steel housing that can be used with the present invention.

FIG. 1 shows a conventional stainless steel housing assembly 100 used in the filtering of pharmaceuticals and other fluids. In a traditional system, the housing assembly 100 is divided into two parts; an upper housing 110 and a lower housing 120. The lower housing 120 is typically fixed in place, as it contains the plumbing and electrical connections to the unit. Unfiltered fluids enter the lower housing 120 through an inlet conduit 130 and filtered materials exit the lower housing 120 via an outlet conduit 140.

Traditionally, stainless steel is used to make these housings. However, other metals can also be utilized. In another embodiment, plastic material can also be molded to form the housing components.

One or more filter elements may be installed in the lower housing. After these elements are installed, the upper housing 110 is positioned atop the lower housing, and secured in place. Typically fasteners 150, such as metal clasps, are used to hold the two portions together.

To insure a proper seal between the upper and lower housings, a gasket 160, such as an O-ring, is typically utilized. In most cases, this gasket 160 is ring-shaped, or annular. This gasket 160 is constructed from a biocompatible material, which is able to withstand the temperatures attained within the housing. In addition, the material must also be sufficiently elastic, so as to form an air and fluid tight seal. In a preferred embodiment, a silicone-based material is molded into the required shape. This gasket 160 is then placed between the upper 110 and lower housings 120.

This gasket 160 provides an opportunity to pass signals between the interior and exterior of the housing without compromising the integrity of the system.

Figure 2:
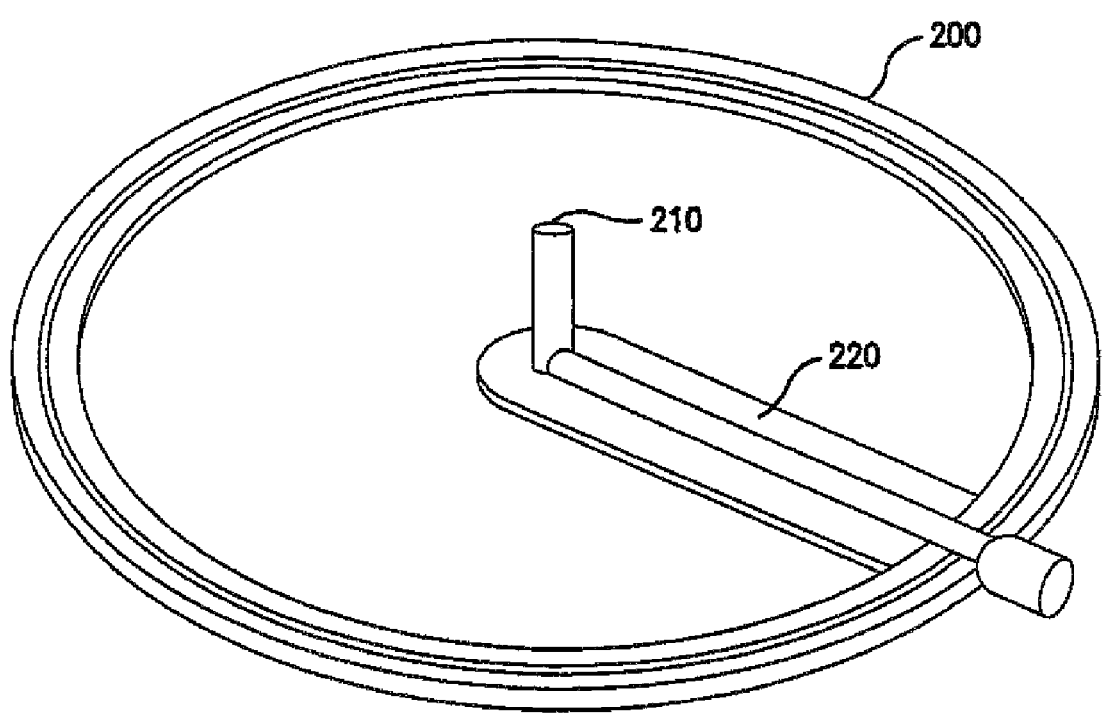
FIG. 2 shows a first embodiment of the present invention.

In one embodiment, shown in FIG. 2, one or more electrical conduits (not shown), such as wires, are molded into the gasket 200. The gasket 200 is preferably produced using a double molding process, so as to insure that the conduits are completely encapsulated within the gasket material. These conduits terminate in an antenna 210, preferably a dipole antenna. This antenna 210 is also molded so as to be completely encapsulated within the gasket material 200. In a certain embodiment, the antenna 210 is positioned to be at or near the center of the circle defined by the annular gasket, so as to minimize interference from the stainless steel housing. While FIG. 2 shows the antenna 210 held in place by a single support arm 220, the invention is not so limited. For example, the support arm 220 may attach on both its ends to the gasket 200. In a certain embodiment, the support arm 220 traverses a diameter of the gasket 200. In another embodiment, a number of support arms 220, preferably equally spaced, extend from the annular gasket 200 to the center of the circle, thereby resembling spokes. The support arms 220 may be constructed from a silicon-based material as is used for the gasket 200, or may be a thermal plastic capable of withstanding the temperature inside the housing assembly. Typically, the conduits are embedded in the length of a single support arm to reach the antenna. The other support arms 220 are typically only mechanical supports and have no electrical function.

Figure 3:
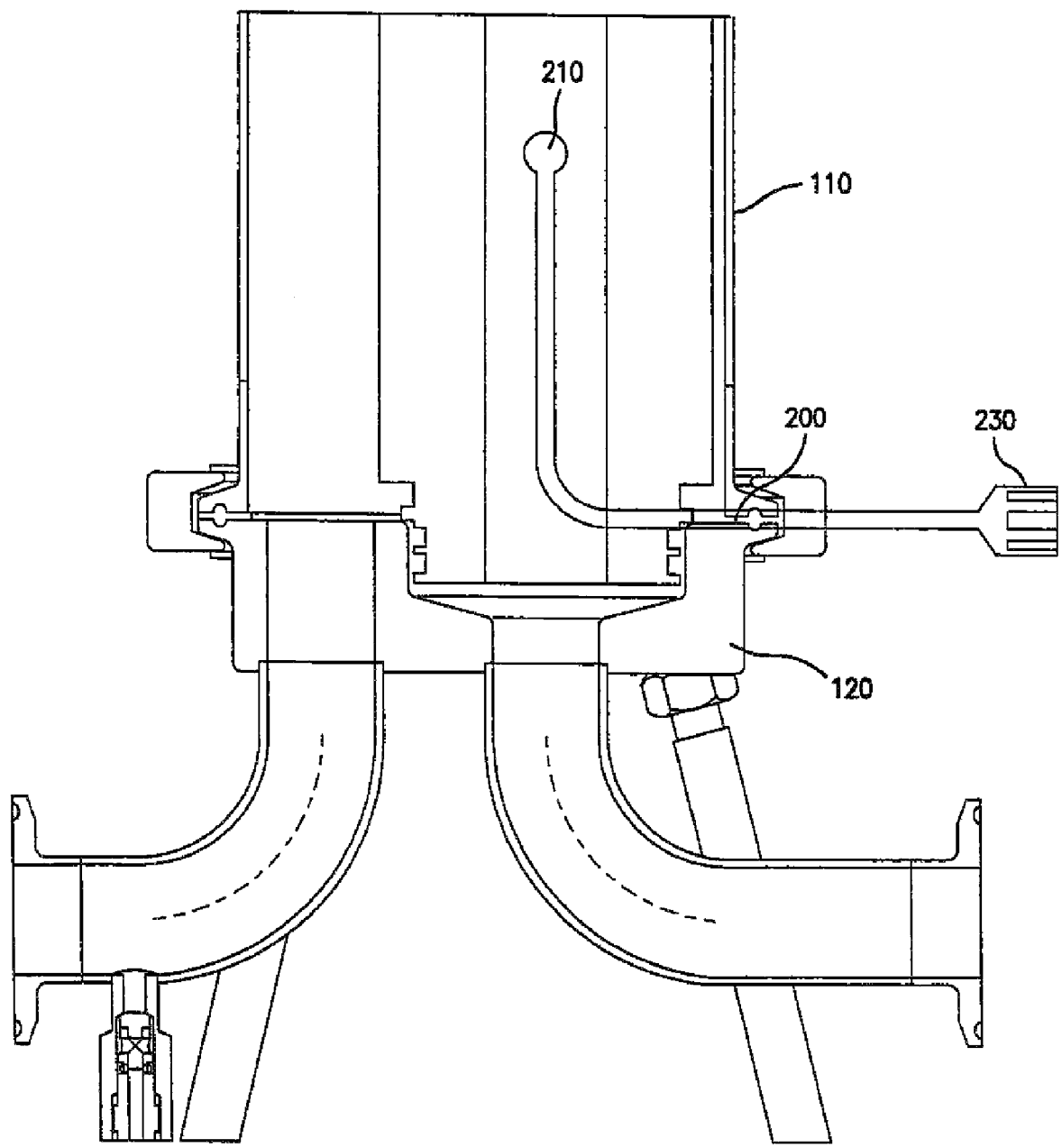
FIG. 3 shows a side view of the embodiment of FIG. 2.

FIG. 3 shows a side view of the embodiment of FIG. 2, as it appears when in use. Gasket 200 is located between the upper housing 110 and the lower housing 120. Antenna 210 extends from the gasket 200 into the housing. The opposite end of the gasket 200 terminates preferably in a connector 230. This connector 230 can then be attached to various external components.

As mentioned above, the antenna 210 and the conduit(s) are molded into the gasket material so as to protect them from the external environment. The opposite end of the electrical conduit(s) exits the gasket 200 on the exterior side of the housing assembly. The conduit(s) may terminate in a connector located directly on or in the gasket. This connector may then be mated with an external component, such as a device for monitoring the internal conditions of the housing assembly, via a cable or wiring harness. Alternatively, the electrical conduit(s) may exit the gasket 200 as a set of one or more wires or cables, which can be inserted directly into an external component. The specific output configuration used is an implementation specific decision and may include the embodiments described above or any other suitable means. In another embodiment, the electrical conduit terminates in a connector, located separate from the gasket, as shown in FIG. 3.

In operation, an external device having communication capability, and preferably storage and computing capabilities is connected to the gasket 200 (and therefore the antenna) via a connection mechanism, such as a cable and/or connector. In a preferred embodiment, a dipole antenna is used within the gasket, as shown in FIG. 3. The external device transmits information and queries to the interior of the housing assembly via the antenna encapsulated within the gasket. In a similar fashion, information from within the housing assembly is retrieved from filtering elements via the same antenna. The type of information passed between the interior of the housing assembly and the device can be varied in nature. Information such as temperature, pressure, manufacturer ID number, hours of operation, the number of sterilization cycles performed, etc, can be transmitted between the device and the housing assembly. This list is just an illustration of the type of information that can be transmitted and is not intend to represent a complete list.

The use of an antenna enables communication between the external device and any devices within the housing. These devices may include pressure sensors, temperature sensors, concentration sensors, RFID tags, storage elements having communication capabilities, and others. Additionally, these devices may include a plurality of functions. For example, a filter element may have an embedded pressure sensor, a storage element, capable of storing pressure readings, and communication capability to transmit the stored information to the external environment. The storage device is typically an electronic memory device, such as a RAM, DRAM, EPROM, Flash ROM, or other suitable device. Alternatively, the devices may have no storage element and can only relay realtime information.

In some applications, these communication devices may be embedded into a filter element, as described above. In other applications, the communication device may be affixed to the housing. For example, a plurality of temperature sensor may be affixed to the housing to allow monitoring of the internal temperature at various points within the housing.

The communication protocol used can be varied and no particular format is required by the present invention. For example, RFID may be used. Alternatively, Bluetooth®, Zipbee®, WiFi® (including 802.11a/b/g), are all contemplated. Additionally, other wireless protocols not enumerated above are also possible and within the scope of the invention.

The benefits of such a configuration are obvious. Previously, the housing assembly had to be disassembled to inspect the condition of the components within it. This disassembly was time consuming, and resulting in decreased efficiency. By being able to communicate within the assembly in situ, the assembly need only be disassembled when maintenance is required, thereby reducing downtime.

The above description recites a gasket that exists between an upper and lower housing in a housing assembly, but the invention is not so limited. For example, a gasket of the type described can be introduced between any two separable portions of the housing. For example, in certain embodiments, a gasket exists between the top vent and the top vent pipe. In this embodiment, it is possible to insert the gasket of the present invention between these two separable portions. Any location in which two separable portions of housing come together can be used to insert this gasket.

Furthermore, the above description recites a filter housing containing one or more filters, which is used to filter media. However, the invention is not limited to only this application. Other housings, such as an autoclave housing, are also contemplated. An autoclave housing is used to sterilize the filter elements, but is not used to actually filter media. Within the autoclave, information such as internal temperature may be important to monitor externally. The present invention provides the communication mechanism by which that can happen. Furthermore, the type of device contained within the housing is not limited. While the above description recites filtering elements, the invention also applies to any device with an electronic component contained within a housing. For example, disposable components, such as tubes or reaction bags, installed in an autoclave housing, may also be communicated with via the present invention.

The above description discloses a purely communicative link, such as a dipole antenna. However, the invention is not limited to only communications between the assembly and the external environment. In another embodiment, the gasket is also used to provide a power source for use within the housing assembly.

Figure 4:
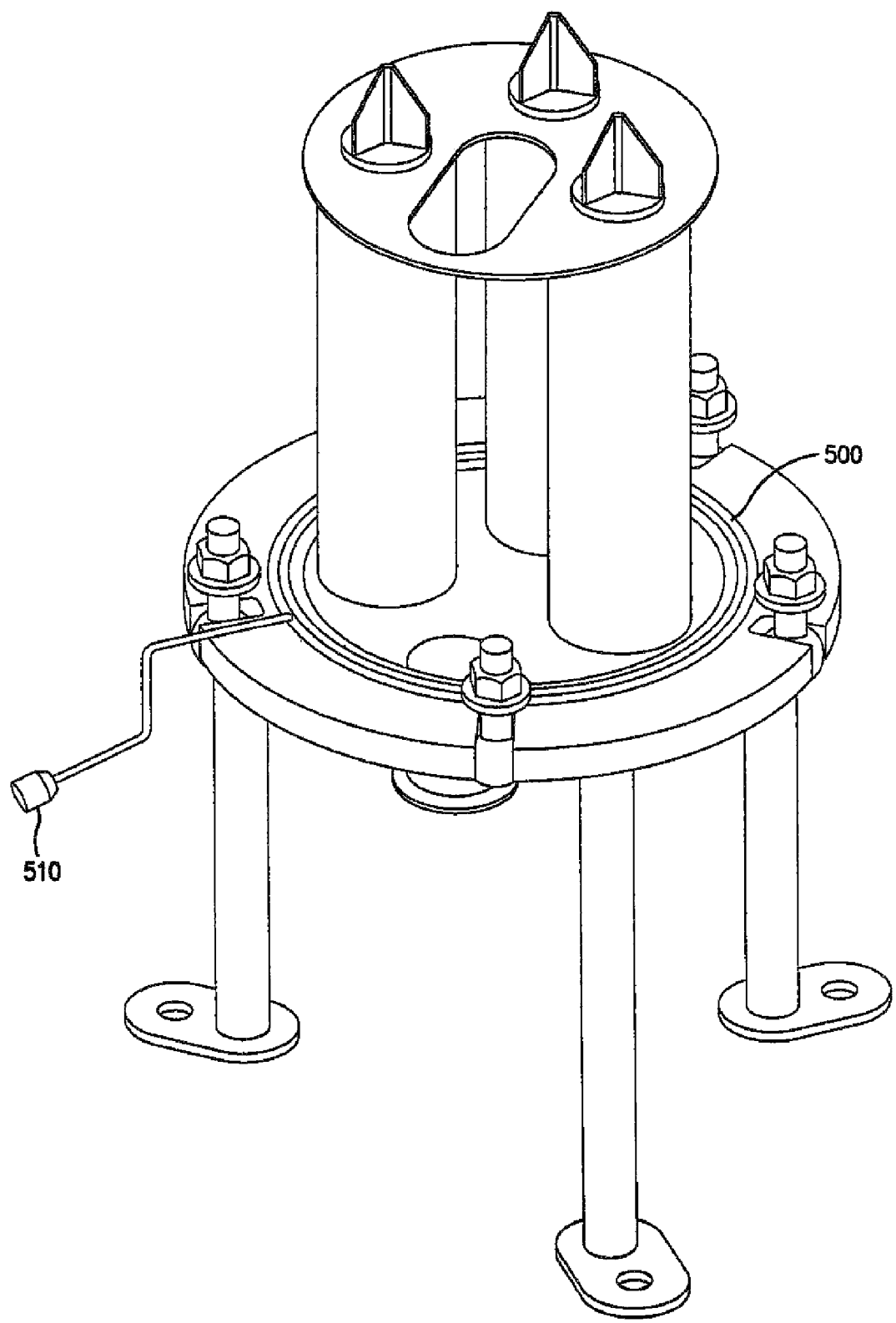
FIG. 4 shows a second embodiment of the present invention.

It is well known that induction can be utilized to provide power to a device to which there is no physical connection. Typically, a wire coil is wound a number of times, and an alternating current is passed through it. This alternating current produces a changing magnetic field around the coil. A secondary coil, physically separate and remote from the first coil, can then be used to convert this changing magnetic field back into an alternating current. This current can then be used by the filtering element to power its integrated electronics. Using this technique, the present invention optionally supplies inductive power to the devices, such as smart filter elements, within the housing assembly. In one embodiment, shown in FIG. 4, one large inductive loop 500 is provided along the inner circumference of the annular gasket. An electrical conduit encircles the gasket a plurality of times, with a greater number of windings inducing a greater magnetic field. This embodiment provides the least disruption to the normal fluid flow within the housing assembly. This inductive loop 500 may be an integral part of gasket 160, such that the gasket 160 serves its traditional function, and has sufficient width so as to protrude far enough into the housing assembly so as to serve as the inductive loop 500. In another embodiment, the inductive loop 500 is a smaller concentric circle within the gasket. In this case, the wires pass from the external environment through the gasket 160 to the loop. Current is supplied to the loop 500, preferably via an external power source (not shown). In one embodiment, a connector 510, external to the housing assembly, is used to connect to the power source. This allows rapid connection and disconnection. Alternatively, wires may exit from the loop 50, which are then connected to an external cable or to the power supply.

Figure 5:
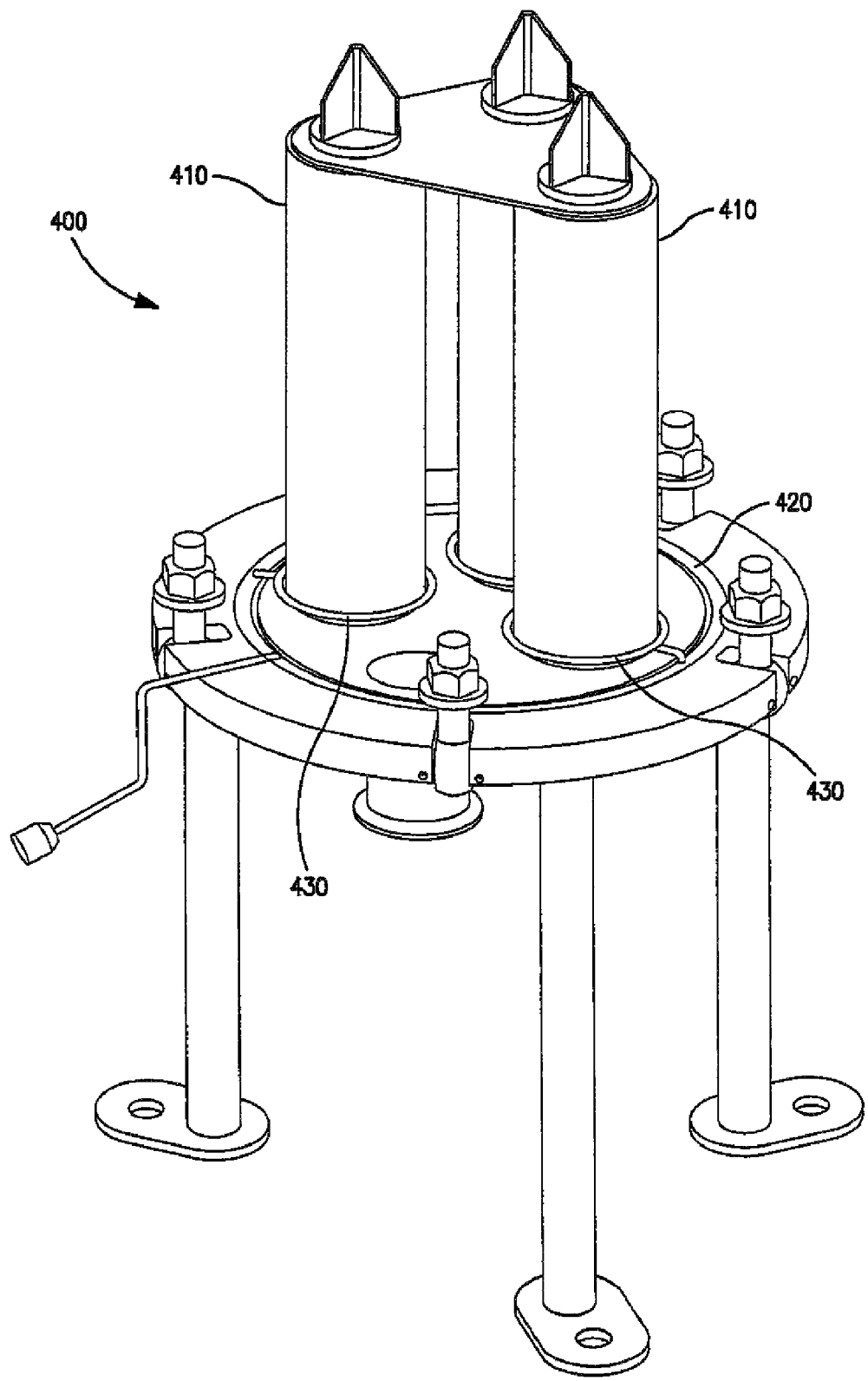
FIG. 5 shows a third embodiment of the present invention.

However, other embodiments are also possible. For example, in a housing assembly having a plurality of filtering elements, the gasket material can be formed so as to create an inductive loop near each filtering element, as shown in FIG. 5. In this embodiment, three filtering elements 410 are arranged within the housing assembly 400. Consequently, the gasket 420 is molded so as to have three corresponding loops 430 in it, preferably spatially aligned with the positions of the filtering elements 410 within the housing 400. Each loop 430 generates an inductive field, which is received by the corresponding coils in the associated filter and converted back into electrical power. This power is then used to operate the electronics and other circuitry resident in the filter element.

Such a configuration allows the filters to contain more advanced circuitry and therefore increases the amount of data and the richness of its content available to the external device. While two embodiments are presented, the invention is not so limited. The inductive loops can be placed in any location within the housing. Furthermore, the number of loops is not limited, nor is there any restriction on the sizes of these loops. For example, one large loop may be molded into the gasket, or one or more smaller loops may be used. The loops may be part of the annular seal, or may be an additional portion added specifically for this purpose. Furthermore, the loops need not be the same size. The loops may also have as many windings as are required to create the desired field.

As explained earlier, the creation of an inductive magnetic field requires the use of alternating current in a loop. This current source is provided outside of the housing assembly. As was described with respect to the antenna connections, the power connection to the gasket may be a connector located on the outside of the gasket. Alternatively, one or more wires may exit the gasket and be connected directly to a power source. In one embodiment, a coaxial cable is used, in which the positive and negative conductors are separated to form a loop. As described above, the specific configuration of the power conduits outside of the housing assembly is implementation specific.

The use of such a gasket allows users to upgrade the capabilities of their equipment economically. The user of a traditional stainless steel housing assembly need only use the gasket of the present invention in conjunction with smart filtering elements to realize the benefits of these embedded electronics. There is no need to retrofit or replace the existing housing assembly, which is typically very expensive.

The present invention also minimizes clutter and wiring around and near the housing assemblies. As described, the gasket may have one or more connectors, through which data communication and power are passed. Thus, a single set of wires or cables is connected to the gasket to perform all of the required functions. Furthermore, in those instances when it is necessary to open the housing assembly, the disassembly of the unit is quite simple. The cable can be disconnected from the gasket, the upper housing can be removed, and the gasket can then be removed. There is no need for multiple harnesses, thereby furthering simplifying the use of this new gasket.

What is claimed is:
1. A gasket, comprising:
 a. A ring-shaped elastic material adapted to form a seal between two separable portions of a housing assembly;
 b. an antenna, encapsulated in said elastic material, located within the region defined by said ring;
 c. a support arm, extending inwardly from said ring, to hold said antenna; and
 d. a conduit, molded in said gasket, electrically connecting said antenna to the exterior of said housing assembly.

2. The apparatus of claim 1, wherein said elastic material comprises a silicone-based material.

3. The apparatus of claim 2, wherein said antenna is positioned at the center of said ring.

4. The apparatus of claim 1, comprising a plurality of support arms extending inwardly from said ring.

5. The apparatus of claim 1, wherein said support arm comprises a silicone-based material.

6. The apparatus of claim 1, wherein said support arm comprises a thermal plastic.

7. The apparatus of claim 1, wherein said conduit is embedded in said support arm.

8. The apparatus of claim 1, further comprising a connector connected to said conduit on said exterior of said housing assembly.

9. The apparatus of claim 1, wherein said antenna comprises a dipole antenna.

10. A method of obtaining information from within a housing assembly having at least two separable portions, comprising:
  a. Providing a gasket between said portions so that a portion of said gasket forms a seal between said separable portions;
  b. Embedding an electrical conduit in said gasket;
  c. Providing an antenna within the region defined by said housing assembly connected to the exterior of said housing assembly via said conduit;
  d. Providing a device external to said housing, having communication capacities;
  e. Connecting said device to said conduit so that said device is electrically connected to said antenna; and
  f. Wirelessly transmitting information from within said housing assembly to said antenna, thereby allowing said information to be received by said device.

11. The method of claim 10, further comprising a second device within said housing assembly having wireless communications capabilities.

12. The method of claim 10, wherein said information is selected from the group consisting of temperature, pressure, manufacturer ID number, hours of operation, and the number of sterilization cycles performed.

13. The method of claim 11, wherein said second device is selected from the group consisting of pressure sensors, temperature sensors, concentration sensors, RFID tags, storage elements having communication capabilities and filter elements.

14. The method of claim 11, wherein said second device is affixed to a filter element.

15. The method of claim 11, wherein said second device is affixed to said housing assembly.

16. A method of insuring the sterilization of a filter element within an autoclave, comprising:
  a. providing a temperature sensor within said autoclave;
  b. Providing a gasket between separable portions of said autoclave, so that said gasket forms a seal between said separable portions;
  c. Embedding an electrical conduit in said gasket;
  d. Providing an antenna within said autoclave connected to the exterior of said autoclave via said conduit;
  e. Providing a device external to said autoclave, having communication capacities;
  f. Connecting said device to said conduit so that said device is electrically connected to said antenna; and
  g. Transmitting temperature information from said temperature sensor to said antenna, thereby allowing the temperature within said autoclave to be monitored by said device.

17. An apparatus to provide power to one or more devices within a housing assembly having at least two separable portions, comprising
  a. a power source to generate an alternating current;
  b. a ring-shaped elastic material adapted to form a seal between said portions;
  c. a number of coils equal to the number of devices, located within said ring and each coil encircling one of said one or more devices, adapted to receive said alternating current so as to generate a changing magnetic field;
  d. A conduit, molded in said elastic material, electrically connecting said one or more coils to said power source.

18. The apparatus of claim 17, where said one or more devices comprise filtering elements.

19. A filtration system, comprising:
  a. A housing assembly, having at least two separable portions;
  b. An elastic material adapted to form a seal between two separable portions of a housing assembly;
  c. an antenna, encapsulated in said elastic material, located within the region defined by said housing assembly;
  d. a conduit, molded in said gasket, electrically connecting said antenna to the exterior of said housing assembly;
  e. a filtering element; and
  f. a device affixed to said filtering element, adapted to wirelessly communicate with said antenna.

20. The filtration system of claim 19, wherein said device is selected from the group consisting of a temperature sensor, a pressure sensor, a concentration sensor, an RFID tag, and a storage element.

* * * * *